(12) United States Patent
Monogioudis et al.

(10) Patent No.: US 7,558,191 B2
(45) Date of Patent: Jul. 7, 2009

(54) METHOD OF OFDM COMMUNICATION USING SUPERPOSITION CODING

(75) Inventors: Pantelis Monogioudis, Randolph, NJ (US); Shirish Nagaraj, Cedar Knolls, NJ (US); Sivarama Krishnan Venkatesan, Milltown, NJ (US); Harish Viswanathan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 489 days.

(21) Appl. No.: 11/516,840

(22) Filed: Sep. 7, 2006

(65) Prior Publication Data
US 2008/0062857 A1    Mar. 13, 2008

(51) Int. Cl.
*H04J 11/00* (2006.01)
(52) U.S. Cl. .............................. 370/208; 375/316
(58) Field of Classification Search ................. 375/219, 375/260, 135, 136, 146, 147, 316; 370/203, 370/204, 208, 210
See application file for complete search history.

(56) References Cited

U.S. PATENT DOCUMENTS 6,449,246 B1 * 9/2002 Barton et al. ............... 370/210
7,031,379 B2 * 4/2006 Sestok et al. ............... 375/219
2002/0176509 A1 * 11/2002 Gatherer et al. ............. 375/260

* cited by examiner

*Primary Examiner*—Brenda Pham
(74) *Attorney, Agent, or Firm*—M. I. Finston

(57) ABSTRACT

Improvements are provided in an OFDM network that uses superposition coding. A broadcast signal and e.g. a unicast signal are each subjected to OFDM modulation including processing by an IDFT, combined, and transmitted using non-orthogonal transmission resources. In one approach, the respective signals are combined after instead of before the IDFT processing. In specific examples, a respective cyclic prefix is appended to each signal after the IDFT processing but before the respective signals are combined. In another approach, a broadcast pilot signal and e.g. a unicast pilot signal are transmitted concurrently with the broadcast and unicast information signals. The pilot signals are transmitted using the same time and subcarrier resources, but are made more distinguishable by combining each with a respective scrambling or spreading code. In specific examples, embodiments, the unicast pilot signal is used for estimating the data rate for transmission of further unicast information signals.

7 Claims, 8 Drawing Sheets

METHOD OF OFDM COMMUNICATION USING SUPERPOSITION CODING

FIELD OF THE INVENTION

This invention relates to methods of transmitting and receiving signals in wireless communication, and more particularly to wireless communication in OFDM networks.

ART BACKGROUND

Orthogonal Frequency Division Modulation (OFDM) is a known method for carrier modulation in digital wireless transmission. Very briefly, a block of information bits for OFDM transmission is mapped to a sequence of modulation symbols. The resulting symbols are applied blockwise as inputs to an inverse discrete Fourier transform (IDFT). The IDFT performs a transformation from the frequency domain to the time domain. Thus, in effect, each modulation symbol modulates a respective subcarrier, and the outputs of the IDFT, after parallel-to-serial conversion, represent, in effect, a sampling of the resulting composite waveform over a specific time interval. This waveform is placed on a radiofrequency carrier and transmitted. At the receiver, the above procedure is inverted to recover the original information bits. Of course only the bare essentials of OFDM have been described here. Further details and refinements will become evident in the discussion below.

Various transmission resources are available for OFDM transmission. These include timeslots, frequency subcarriers, and in some cases may even include spreading codes. Thus for example, a pair of messages may be sent using orthogonal resources by sending them in different timeslots, or on different sets of mutually orthogonal subcarriers.

By using orthogonal resources to transmit a pair of messages, the sender can assure that the messages will be received with little or no mutual interference. However, it is possible under some circumstances to successfully receive two or more messages even if they are transmitted using the same resources. This may be possible if one signal has a higher signal to interference plus noise ratio (SINR) than the other (taking into account the interference due to the lower-SINR signal), the two signals are sufficiently decorrelated with each other to appear to the receiver as random noise, and other contributions to the interference and noise are sufficiently low. Advantageously, the receiver is a successive interference cancellation receiver.

One useful way to decrease signal correlations is by scrambling. In scrambling, a signal is combined, e.g. by a blockwise exclusive-or (XOR) operation, with a pseudorandom sequence referred to as a "scrambling sequence" or "scrambling code." The code is known to the receiver, so the scrambling can be inverted for signal recovery.

If the higher-SINR signal is in fact strong enough (at the pertinent data rate) to be successfully received and decoded, it can be used to reconstruct a sample-level signal devoid of the lower-SINR signal. By "sample-level signal" is meant the transmitted signal just before placing it on the radiofrequency carrier, or the received signal at baseband level just after recovering it from the radiofrequency carrier. By subtracting the reconstructed signal from the total received signal at sample level, an estimate is obtained of that portion of the received signal that is solely attributable to the lower-SINR signal (plus interference and noise). If interference and noise are low enough, the channel coefficients are known well enough, and an appropriate data rate has been chosen, the message encoded in the lower-SINR signal can be recovered.

The process outlined above for sending and receiving message transmissions that share the same resources is referred to as "superposition coding."

Superposition coding can be used to increase the spectral efficiency of OFDM networks. For example, one proposed application of superposition coding involves the type of network in which the same physical level packet or other physically transmitted signal can be transmitted in a broadcast simultaneously by the base stations serving all cells within a broadcast zone. With superposition coding, each base station can send unicast or multicast messages using the same resources as the broadcast message. Because the various participating base stations reinforce each others' broadcast transmissions, each base station can generally reserve some power for the unicast or multicast transmissions. The ratio between broadcast and unicast (or multicast) power at each base station can be adjusted to optimize spectral efficiency, at given data transmission rates.

At each downlink receiver, the broadcast signal will generally be the signal with the higher SINR. Thus, it will also generally be the main source of interference to the unicast or multicast signal. However, because all base stations in the broadcast zone are sending the same interfering (relative to the unicast or multicast) broadcast signal, subtraction of the reconstructed signal will generally be very effective for removing such interference and thus permitting the lower-SINR unicast or multicast to be recovered at the receiver.

Although substantial progress has been made in devising such schemes, opportunities remain for further improving the performance of networks using such schemes.

SUMMARY OF THE INVENTION

We have developed certain new approaches that can improve network performance in superposition coding.

One example embodiment involves a transmission method in which at least a first and a second information signal are each subjected to OFDM modulation including processing by an IDFT, combined, and transmitted using non-orthogonal transmission resources. Significantly, the respective signals are combined after the IDFT processing. In specific embodiments, a respective cyclic prefix is appended to each signal after the IDFT processing but before the respective signals are combined. In illustrative embodiments described below, precisely two levels of information signal are superposed, i.e., unicast and broadcast. However, the principles to be described are not limited to the superposition of only two levels of signal, but rather three or more levels can likewise be superposed.

Another example embodiment involves a reception method for signals transmitted as above. According to such a method, a sampled received signal is subjected to a first DFT, and after DFT processing the first information signal is recovered. Then, a first estimate of that portion of the sampled received signal attributable to the first information signal is regenerated at the sample level from the recovered information signal and subtracted from the sampled received signal, thereby to obtain a second estimate of that portion of the sampled received signal attributable to the second information signal. The second estimate is subjected to a second DFT, and after the second DFT processing the second information signal is recovered. In specific embodiments, a cyclic prefix appended to the first information signal is removed before the first DFT, and a cyclic prefix appended to the second information signal is removed after obtaining the second estimate but before the second DFT.

Another example embodiment involves a transmission method in which each of at least the first and second information signals has a respective pilot signal, referred to as the first or second pilot signal as appropriate. The first and second pilot signals are transmitted concurrently with the first and second information signals. The first and second pilot signals are transmitted using the same time and subcarrier resources, but are made more distinguishable by combining each with a respective scrambling or spreading code.

Another example embodiment involves a reception method for signals transmitted as above. According to such a method, a sampled received signal is subjected to a DFT, and the first information signal is obtained as output from the DFT processing. A composite pilot signal is also obtained as output from the DFT and combined with the appropriate spreading code to recover the first pilot signal. Using the recovered first pilot signal, the information in the first information signal is recovered. A first estimate of that portion of the DFT output attributable to the first information signal is regenerated from the information recovered from the first information signal and the recovered first pilot signal. The first estimate is subtracted from the DFT output, thereby to obtain a second estimate of that portion of the DFT output attributable to the second information signal. The recovered first pilot signal is subtracted from the composite pilot signal obtained as output from the DFT, thereby to recover the second pilot signal. The second information signal is recovered from the second estimate and the recovered second pilot signal. In specific embodiments, the recovered second pilot signal is used for estimating the data rate for transmission of further second information signals.

In specific embodiments of all the examples described above, the first information signal is a broadcast signal and the second information signal is a unicast or multicast signal.

BRIEF DESCRIPTION OF THE DRAWING

To facilitate comparison among the various methods described below, we have endeavored to identify analogous functional blocks throughout the figures by like reference numerals, to the extent feasible without sacrificing clarity. Exceptions have been made, for example, where multiple functions that had previously been individually depicted are represented for brevity by a single pictorial block.

DETAILED DESCRIPTION

Figure 1:
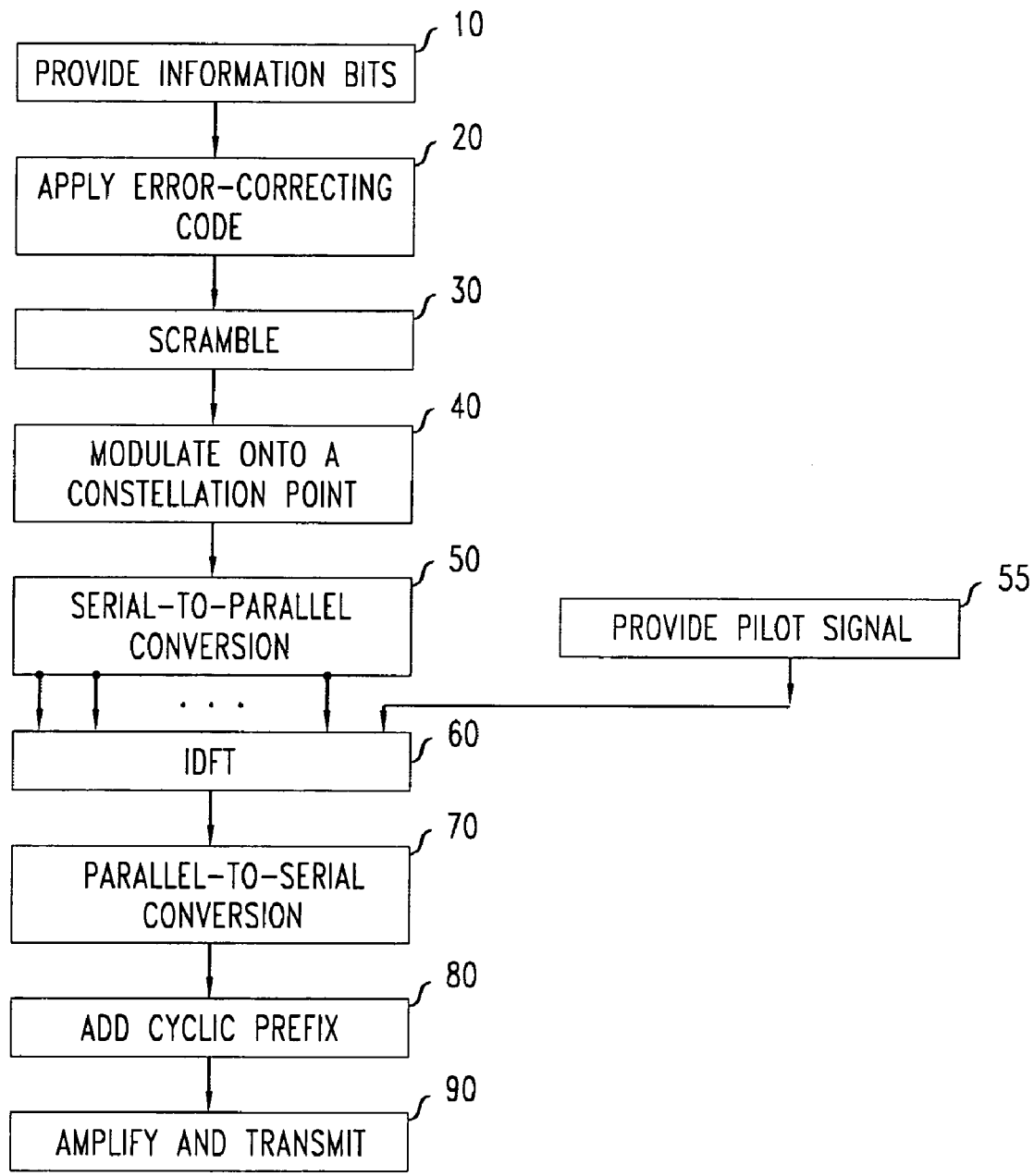
FIGS. 1 and 2 are simplified functional diagrams of, respectively, an OFDM transmitter and receiver of the prior art.

By way of introduction, we first describe the simple OFDM transmitter of FIG. 1. Turning to the figure, it will be seen that at block 10, a block of information bits is provided. It would be typical to apply an error-correcting code to the information bits according to well-known techniques, as indicated at block 20, and further to apply a scrambling code as indicated at block 30. As is well-known in the art, the scrambling code is useful for reducing interference correlations with downlink transmissions in other sectors or cells. At block 40, the coded and scrambled (but still binary) data block is mapped to a sequence of modulation symbols according to a modulation scheme such as 16QAM.

As is known in the art, it may be advantageous to subject the output of block 40 to a further scrambling process before serial-to-parallel conversion 50. The further scrambling process, which for brevity has been omitted from the figures, typically involves combining the sequence of modulation symbols with a complex scrambling code that is self-specific for unicast transmissions and common for broadcast transmissions. In examining the accompanying figures, this further scrambling process should be understood as subsumed into the blocks representing the pertinent modulation steps, and likewise the corresponding descrambling process should be understood as subsumed into the blocks representing the pertinent demodulation steps.

After serial-to-parallel conversion 50, the block of symbols is applied in parallel to the inputs of IDFT module 60. After IDFT processing, the block of outputs of module 60 is subjected to parallel-to-serial conversion 70 to produce a time sequence of discrete values essentially representative of a baseband-level waveform to be transmitted. At block 80, a cyclic prefix is added to the waveform according to well-known methods in the field of OFDM transmission. At block 90, the waveform is subjected to further processing, including modulating it onto a radiofrequency carrier and amplifying it, and it is then transmitted.

Figure 2:
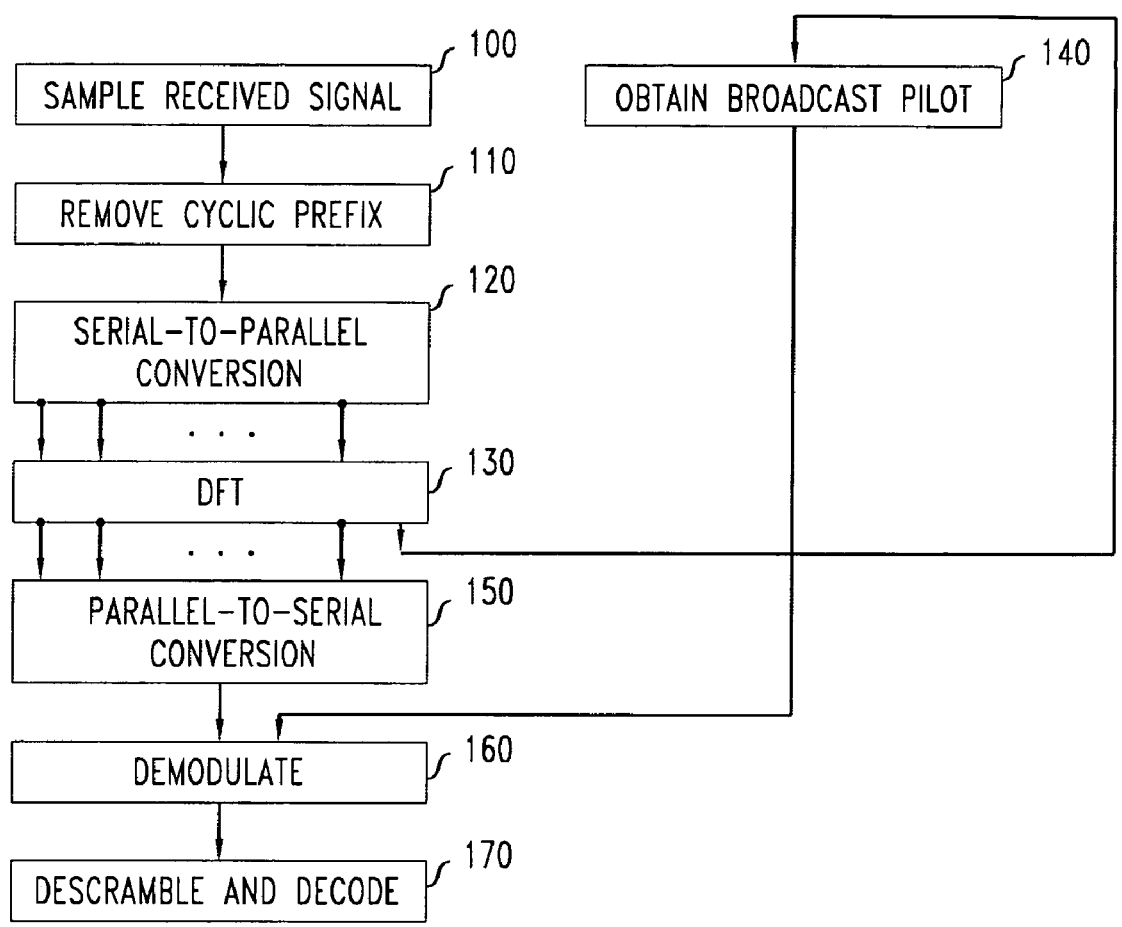

FIG. 2 illustrates the corresponding receiver. Turning to FIG. 2, it will be seen that a signal block as received over the air interface and restored to baseband level is sampled at block 100. At block 110, the cyclic prefix is removed. It should be noted in this regard that the cyclic prefix is useful for defining a time window within which an autocorrelation function can be used to temporally align the multiple copies of the transmitted signal that are received after various path delays. To be effective for this purpose, the length of the cyclic prefix is typically made at least as long as the greatest difference in path delay that it is desirable to account for. The cyclic prefix is also useful for reducing inter-symbol interference across OFDM symbols, and thereby to simplify the receiver processing.

With further reference to FIG. 2, it will be seen that after removal of the cyclic prefix, the sampled signal is subjected to DFT processing at block 130. Serial-to-parallel conversion at block 120 conditions the signal for the DFT, and parallel-to-serial conversion at block 150 conditions the signal for further processing after the DFT as a sequence of modulation symbols. For brevity, we will omit the serial-to-parallel and parallel-to-serial conversion blocks from some of the later figures.

At block 140, a pilot signal, which may for example be a broadcast pilot signal as illustrated here, is obtained from the pertinent output port or ports of the DFT module. At block 160, information about the physical propagation channel obtained from the pilot signal is used to demodulate the sequence of modulation symbols, thereby to remap it to a block of binary bits. At block 170, the block of binary bits is descrambled and decoded to recover the message, i.e., the original block of information bits.

Figure 3:
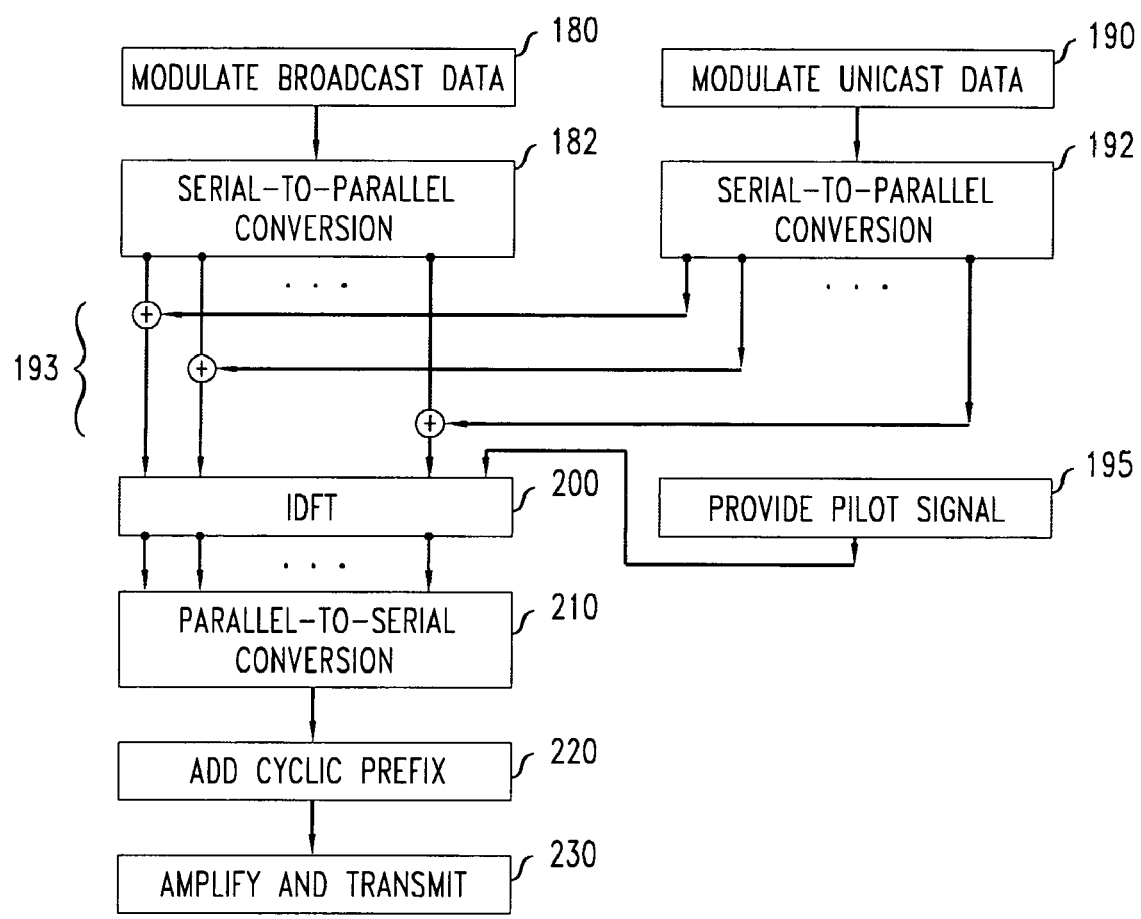
FIGS. 3 and 4 are simplified functional diagrams of, respectively, an OFDM transmitter and receiver of the prior art configured for sending and receiving superposition coded signals.

FIG. 3 shows a known OFDM transmitter configured for superposition coding. It will be seen that two distinct blocks of information bits are to be transmitted. The first type of information is identified in the figure as "broadcast data," and the second type is identified as "unicast data." Although unicast data will be used as an example of the second type of information in the following discussion, it should be borne in mind that the second type of information is more expansive and also includes, for example, multicast data as an alternative to unicast data. At blocks 180 and 190, each respective data block is modulated in a manner analogous to block 40 of FIG. 1. At blocks 182 and 192, each resulting block of modulation symbols is subjected to serial-to-parallel conversion in a manner analogous to block 50 of FIG. 1.

At the processing elements 193 of FIG. 3, the modulation symbols belonging to the respective types of information are combined by blockwise addition. That is, the complex value that appears at each output port of converter 182 is added to the complex value that appears at a corresponding output port of converter 192. The results of the blockwise addition are provided to respective input ports of IDFT module 200. A pilot signal is also provided, as indicated at block 195, to one or more input ports of module 200 that have been reserved for that purpose.

The values appearing at the output ports of IDFT module 200 are subjected at block 210 to parallel-to-serial conversion in a manner analogous to block 70 of FIG. 1. At block 220, a cyclic prefix is added to the serialized data in a manner analogous to block 80 of FIG. 1. At block 230, the resulting signal is conditioned for transmission and transmitted, as in block 90 of FIG. 1. As is known in the art, an appropriate ratio of pilot power to broadcast data power is advantageously determined and applied before transmission.

Figure 4:
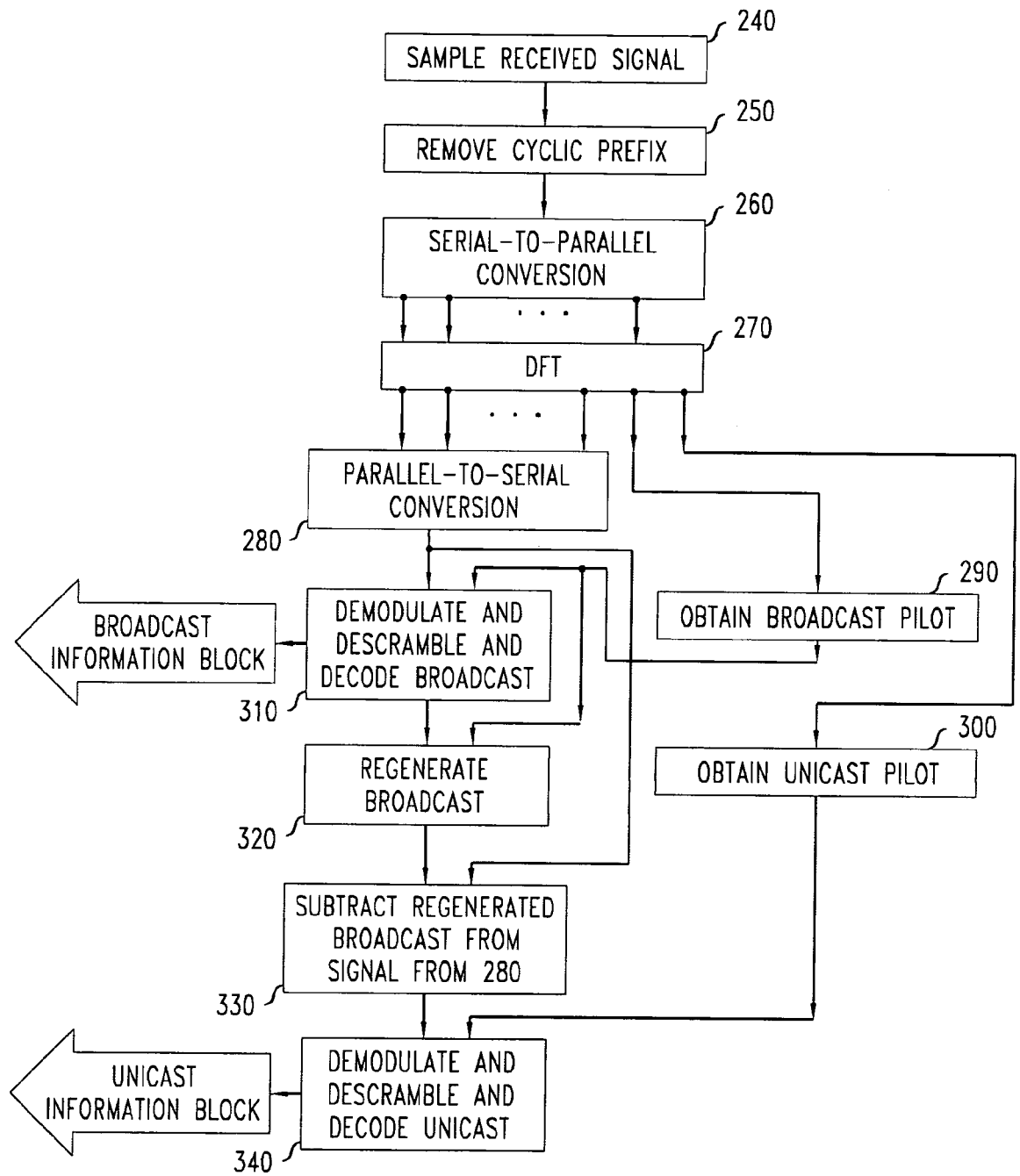

FIG. 4 shows a known OFDM receiver configured for superposition coding. Initial processing of the received signal in blocks 240-280 is analogous to the processing in blocks 100-150 of FIG. 2. Thus, the received signal is sampled at block 240, the cyclic prefix is removed at block 250, and serial-to-parallel conversion, DFT, and parallel-to-serial conversion take place at blocks 260, 270, and 280, respectively. Significantly, broadcast and unicast pilot signals are obtained separately, as indicated in the respective blocks 290 and 300, from different output ports of DFT module 270.

At block 310, information obtained from the broadcast pilot signal is used for demodulating the broadcast signal, and the resulting block of bits is descrambled and decoded to recover the original broadcast information block. During these processing steps, the unicast signal appears as random noise. It should be noted in this regard that the broadcast signal is generally the signal received with the higher SINR, and therefore is generally the signal to be recovered first.

At block 320, the recovered broadcast information block and information obtained from the broadcast pilot signal are used to regenerate an estimate of that portion of the received signal attributable to the broadcast information without the unicast information. The signal is regenerated at the "symbol" level, i.e., at the level of modulation symbols as obtained from the output of DFT module 270 and parallel-to-serial converter 280.

At block 330, the regenerated broadcast signal is subtracted from the symbol-level composite signal obtained from the output of parallel-to-serial converter 280, thereby to obtain an estimate of that portion of the symbol-level signal attributable solely to the unicast information (plus interference and noise). At block 340, the symbol-level unicast signal is demodulated, and the resulting block of binary data is descrambled and decoded to recover the original unicast information block.

It should be noted in this regard that, generally speaking, there are two categories of OFDM frequency resources. In one category, a plurality of distinct, discrete subcarriers is scattered across the range of available subcarriers. In the other category, a plurality of blocks of spectrum is provided. Each block consists of a plurality of adjacent subcarriers.

In the second category, all of the subcarriers that compose a given block are hopped in unison, and demodulation is aided by a block pilot signal that occupies a designated channel.

It should be noted that when unicast and, e.g., broadcast signals are superposed in a block-hopping transmitter according to certain of the methods to be described below, the unicast and broadcast block pilot channels may wholly or partially overlap. This may make it unnecessary for the transmitter to signal the power ratio between the broadcast and unicast traffic.

Figure 5:
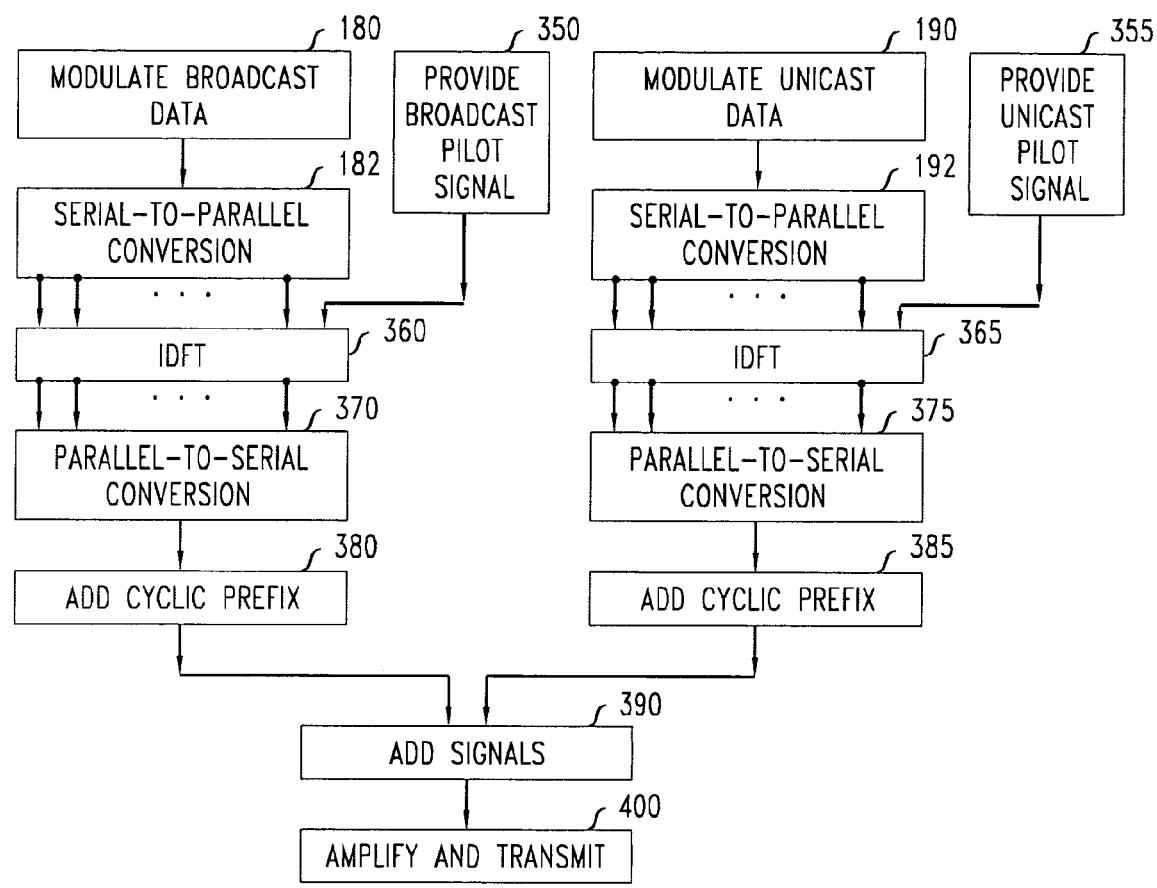
FIGS. 5 and 6 are simplified functional diagrams of, respectively, an OFDM transmitter and receiver configured for sending and receiving superposition coded signals in which the respective signals to be superposed are separately subjected to IDFT processing before combining them and transmitting the combined signal.

Shown in FIG. 5 is an OFDM transmitter that embodies certain of the improvements that we have developed. The modulation of the broadcast data at block 180 and of the unicast data at block 190 is conventional and has been described above. Likewise the serial-to-parallel conversion of the broadcast data at block 182 and of the unicast data at block 192 is conventional and has been described above.

However, in a departure from conventional approaches, each type of signal is separately subjected to IDFT processing before the signals are combined. Thus, the broadcast signal is subjected to IDFT module 360, and the unicast signal is subjected to IDFT module 365. A broadcast pilot signal, provided at block 350, is presented as input to one or more ports of IDFT module 360 reserved for that purpose. Likewise, a unicast pilot signal, provided at block 355, is presented as input to one or more ports of IDFT module 365 reserved for that purpose.

The outputs of the respective IDFT modules are subjected to parallel-to-serial conversion at blocks 370 and 375, and respective cyclic prefixes are appended at blocks 380 and 385. Significantly, the respective cyclic prefixes may have different lengths. This is advantageous when, for example, the unicast signals have less delay spread than the broadcast signals. In such a case, timeslot resources can be used more efficiently by reducing the amount of time dedicated to cyclic prefixes.

In a further departure from conventional approaches, the broadcast and unicast signals are added together at block 390, i.e., after IDFT processing and before the combined signal is conditioned for transmission and transmitted as indicated by block 400.

Figure 6:
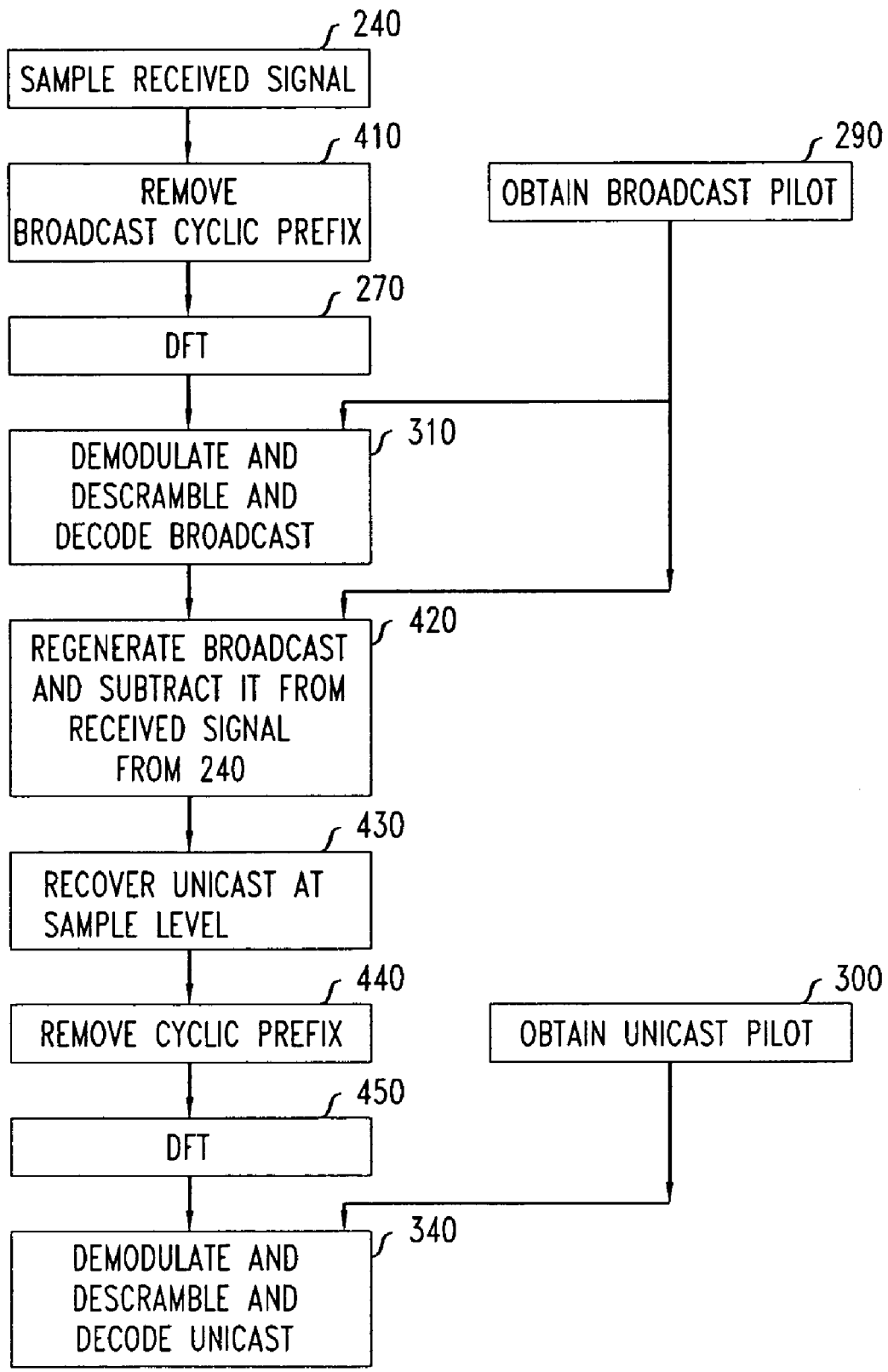

FIG. 6 shows an OFDM receiver configured to receive signals as transmitted, for example, by the transmitter of FIG. 5. For brevity, the serial-to-parallel and parallel-to-serial conversion blocks have been omitted from the figure. They should be understood as subsumed into the DFT blocks 270 and 450.

The sampling of the received signal at block 240 of FIG. 6 is conventional and has been described above. At block 410, the cyclic prefix belonging to the broadcast signal is removed by conventional methods. (We assume here that the broadcast signal is that having the higher SINR. If some other type of signal has the higher SINR, it would be typical to process that higher-SINR signal first.)

At block 270, the received signal is subjected to DFT processing. The processing is conventional and has been described above.

The broadcast pilot signal is obtained at block 290 by conventional methods, and information obtained from the broadcast pilot signal is used at block 310 to demodulate the symbol-level broadcast signal obtained from block 270. Further at block 310, the resulting block of binary data is descrambled and decoded to recover the original broadcast information block.

At block 420, the recovered broadcast information block and information obtained from the broadcast pilot signal are used to regenerate, at the sample level, an estimate of that portion of the composite sample-level signal that is attributable solely to the broadcast information. Further at block 420, the regenerated signal estimate is subtracted from the composite sample-level signal (as obtained at block 240) to recover the unicast signal, that is, to provide an estimate of that portion of the composite sample-level signal that is attributable solely to the unicast information (plus interference and noise). Recovery of the unicast signal is indicated at block 430 of the figure. At block 440, the unicast cyclic prefix is stripped from the recovered unicast signal. At block 450, the recovered unicast signal is subjected to DFT processing to map it to a sequence of modulation symbols.

At block 340, the sequence of modulation symbols is demodulated to a block of binary data, using information obtained from the unicast pilot, which is obtained by conventional methods at block 300.

Further at block 340, the demodulated block of binary data is descrambled and decoded to recover the original unicast information block.

Figure 7:
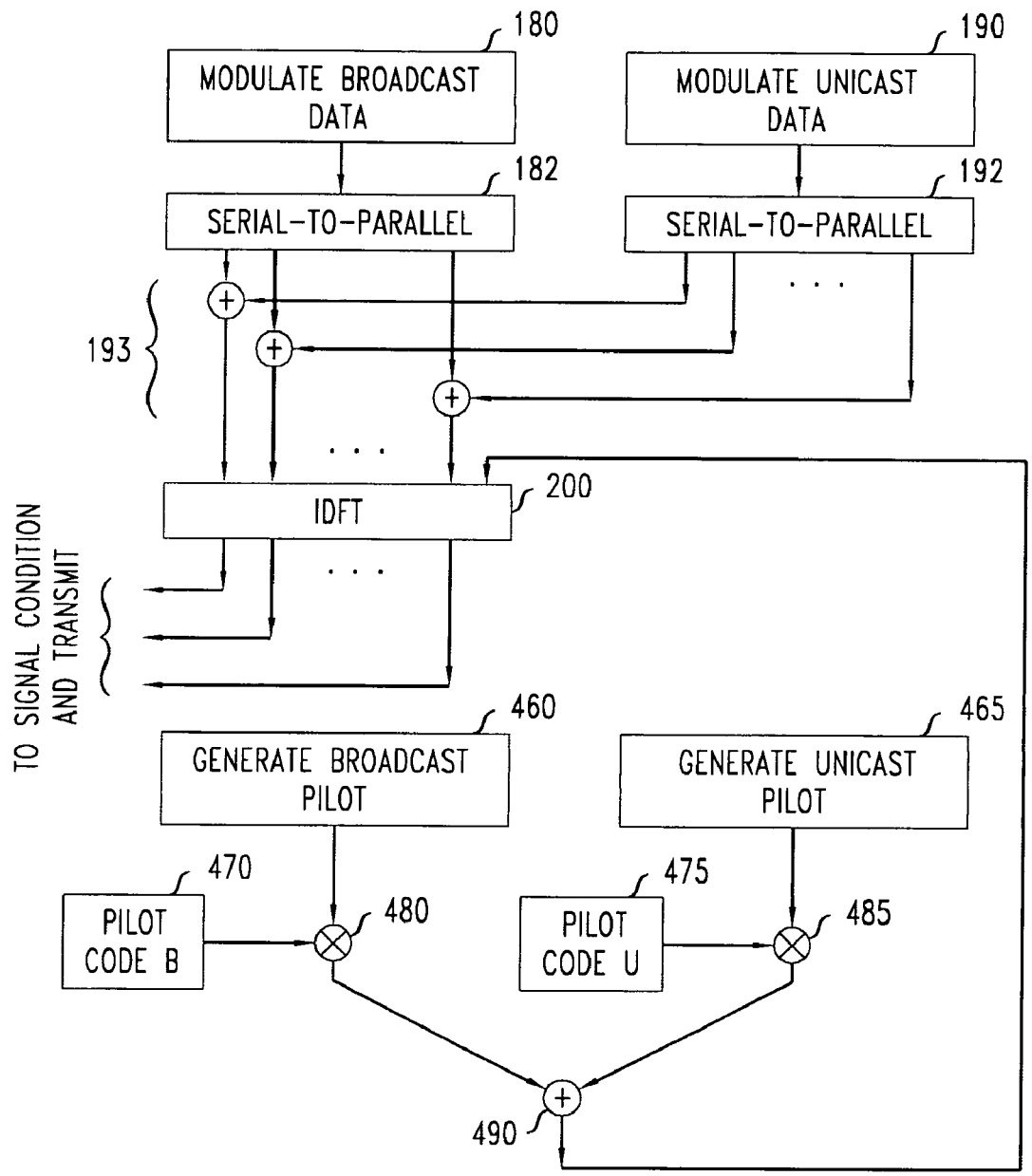
FIGS. 7 and 8 are simplified functional diagrams of, respectively, an OFDM transmitter and receiver configured for sending and receiving superposition coded signals in which pilot signals corresponding to the respective signals to be superposed are made more distinguishable by combining them with respective scrambling or spreading codes, and are then transmitted using the same timeslot and frequency subcarrier resources.

Shown in FIG. 7 is an OFDM transmitter that embodies certain of the improvements that we have developed, other than those illustrated in FIG. 5. The modulation of the broadcast data at block 180 and of the unicast data at block 190 is conventional and has been described above. Likewise the serial-to-parallel conversion of the broadcast data at block 182 and of the unicast data at block 192 is conventional and has been described above. The respective blocks of parallelized data are added at circuit elements 193 by conventional methods described above. The composite block of parallelized data is subjected to IDFT processing at block 200, and subjected to subsequent conditioning for transmission and is transmitted, by conventional methods that are described above.

Distinct broadcast and unicast pilot signals are generated at blocks 460 and 465, respectively. In a departure from conventional methods, the pilot signals are made more distinguishable by combining them with mutually orthogonal spreading codes, such as Walsh codes, or with other types of codes, such as scrambling codes, which might not be mutually orthogonal. As seen, for example, in the figure, Pilot code B is provided at block 470 and combined with the broadcast pilot signal at circuit element 480, and Pilot code U is provided at block 475 and combined with the unicast pilot signal at circuit element 485. At circuit element 490, the respective, spread or scrambled pilot signals are added together to form a composite pilot signal. As seen in the figure, the composite pilot signal is applied to one or more inputs of IDFT module 200 that have been reserved for that purpose. Thus, the two pilot signals are transmitted using the same timeslot and frequency subcarrier resources.

Figure 8:
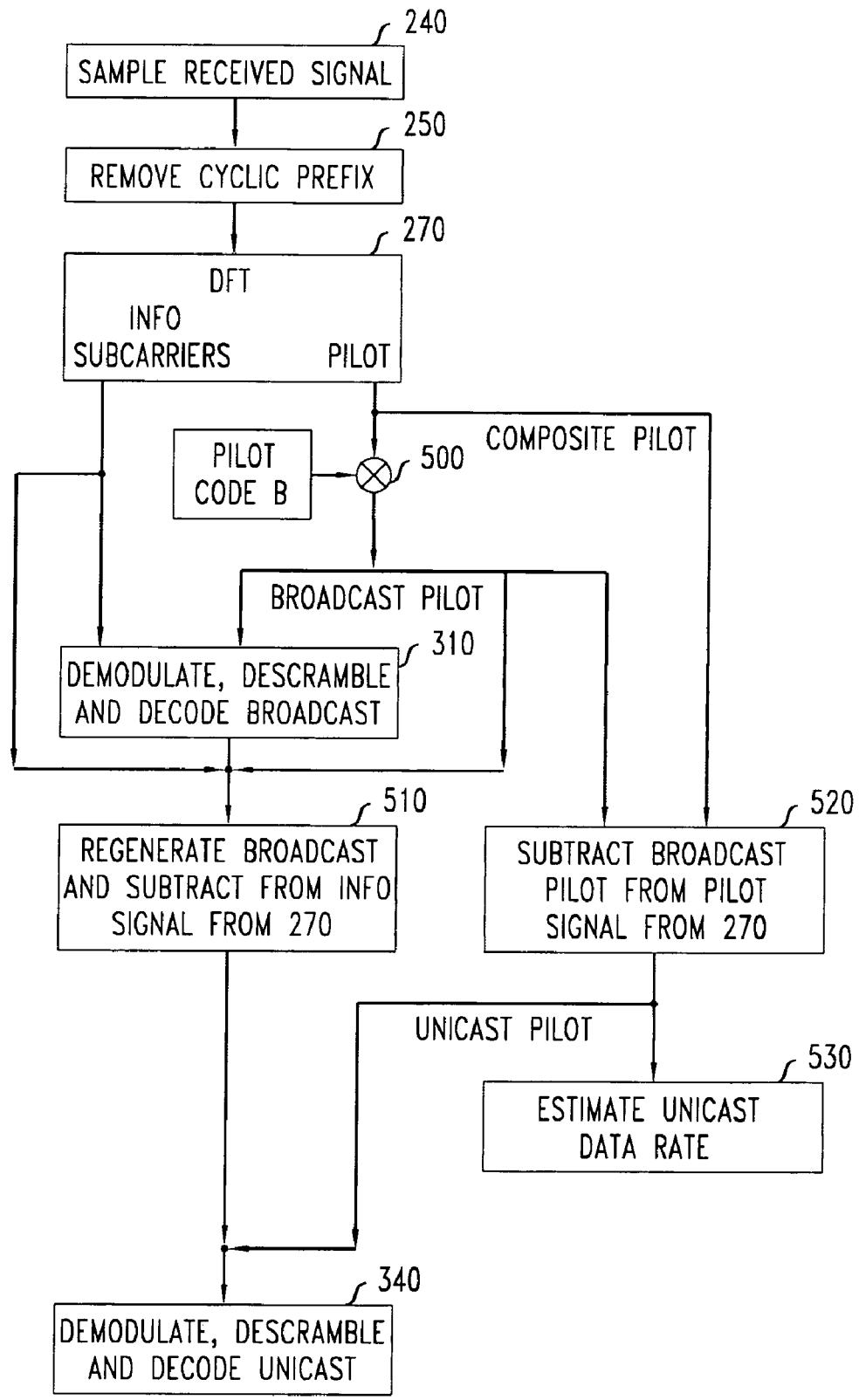

FIG. 8 shows an OFDM receiver configured to receive signals as transmitted, for example, by the transmitter of FIG. 7. For brevity, the serial-to-parallel and parallel-to-serial conversion blocks have been omitted from the figure. They should be understood as subsumed into the DFT block 270.

The sampling of the received signal at block 240 of FIG. 8 is conventional and has been described above. At block 250, the cyclic prefix is removed by conventional methods as described above. At block 270, the received signal is subjected to DFT processing. The processing is conventional and has been described above.

With further reference to DFT module 270, it will be seen that the sequence of values appearing at the DFT output port or ports dedicated to the pilot signals (and subjected to parallel-to-serial conversion which, as noted, is not shown in the figure) is directed to circuit element 500 and to block 520. At circuit element 500, the pilot sequence is combined with Pilot code B to recover the broadcast pilot signal.

At block 310, the output from those ports of DFT module 270 that correspond to the message signal is used, together with information derived from the broadcast pilot signal, to demodulate the broadcast signal from the symbol level. Further at block 310, the resulting block of binary data is descrambled and decoded to recover the original broadcast information block, as described previously.

At block 510, the recovered broadcast information, together with information derived from the broadcast pilot signal, is used to regenerate an estimate of that portion of the symbol-level composite signal, as obtained from the output of DFT module 270, that is solely attributable to the broadcast information. At block 520, the broadcast pilot signal is subtracted from the composite pilot signal as obtained from the output of DFT module 270, thereby to recover an estimate of the unicast pilot signal.

At block 340, the symbol-level unicast signal as recovered at block 510 is demodulated using information derived from the recovered unicast pilot signal. Further at block 340, the resulting block of binary information is descrambled and decoded to recover the original unicast information block, as described previously.

At block 530, information derived from the recovered unicast pilot signal is used to estimate the data rate for the next unicast transmission.

It should be noted in this regard that in at least some current proposals for superposition coding, a common pilot signal, and not a superposed unicast pilot signal, is used to make the channel quality measurements that determine the data rates for unicast transmissions. Although useful, such a scheme is disadvantageous because it does not provide an accurate representation of the interference experienced by unicast data transmissions. In practice, the unicast transmissions from various different base stations in a coverage area may interfere with each other. Moreover, the partition of total transmission power between the broadcast and unicast signals may vary over time, and from base station to base station. As a consequence, the interference, and more particularly the SINR of unicast signals, can vary in a complicated way that is not captured by channel quality measurements based on the common pilot.

As a consequence, we expect that rate estimates will be improved if they are based on the superposed unicast pilot signal in those timeslots that have been designated for superposition coding. Such an approach is applicable both in the type of receiver represented by FIG. 6, and in the type of receiver represented by FIG. 8 as discussed above.

A further strategy that may improve network performance is to use superposition coding for retransmission of broadcast signals. That is, coverage problems in networks, particularly at the edges of broadcast zones, may cause users in some cells to receive broadcast messages with unacceptably low SINR or unacceptably high error rates. Base stations serving the affected cells, or even cooperating base stations serving other cells, may improve reception by allocating some power in subsequent timeslots for retransmitting the broadcast information in superposition with unicast transmissions. The partition of total transmission power between the unicast and the broadcast retransmission can be varied among the participating base stations in such a way as to maximize efficiency, taking retransmission into account.

Typically, a control element within the network will locate the coverage problems and schedule the retransmissions accordingly. Known protocols may be used to identify the broadcast timeslots, including those to be used for retransmission, for example during the call set-up procedure when a new user terminal joins a broadcast group. Moreover, retransmissions may, according to known protocols, be identified by headers or by signaling information sent on a separate communication channel.

Without limitation, the transmitter operations described above may be performed, e.g., at a base station of an OFDM network, and the receiver operations may be performed, e.g., within a mobile telephone or other user terminal of an OFDM network. The mathematical operations described above may be carried out, by way of example and without limitation, by special purpose or general purpose circuitry including digital signal processors, application specific integrated circuits, and digital computers operating under appropriate software control.

The invention claimed is:

1. A method of signal processing in a receiver configured to process signals at least at a sample level and a symbol level, comprising:
    sampling an incoming wireless signal;
    subjecting the sampled signal to discrete Fourier transform (DFT) processing, thereby to obtain a composite symbol-level signal;
    recovering a first block of information from the composite symbol-level signal;
    from the recovered first block of information, regenerating at the sample level a first estimate of that portion of the sampled incoming signal that is attributable to the first block of information;
    at the sample level, subtracting the first estimate from the sampled incoming signal, thereby to provide a second estimate of that portion of the sampled incoming signal that is attributable to a second block of information;
    subjecting the second estimate to DFT processing, thereby to obtain a further symbol-level signal; and
    recovering the second block of information from the further symbol-level signal.

2. The method of claim 1, further comprising:
    removing a first cyclic prefix from the sampled signal before subjecting the sampled signal to DFT processing; and
    removing a second cyclic prefix from the second estimate before subjecting the second estimate to DFT processing.

3. The method of claim 1, wherein the sampled incoming signal comprises a broadcast superimposed with a unicast or multicast, one of said first and second blocks of information belongs to the broadcast, and the other of said first and second blocks of information belongs to the unicast or multicast, and the method further comprises:
    obtaining from the sampled incoming signal a unicast or multicast pilot signal; and
    from the unicast or multicast pilot signal, computing rate information for a subsequent unicast or multicast transmission.

4. A method of signal processing in a receiver configured to process signals at least at a sample level and a symbol level, comprising:
    sampling an incoming wireless signal;
    subjecting the sampled signal to discrete Fourier transform (DFT) processing, thereby to obtain a composite symbol-level signal and a composite pilot signal;
    combining the composite pilot signal with a spreading or scrambling code, thereby to recover a first pilot signal;
    using the recovered first pilot signal to recover a first block of information from the composite symbol-level signal;
    recovering at least a second pilot signal from the composite pilot signal; and
    recovering at least a second block of information, using the recovered pilot signals and the recovered first block of information.

5. The method of claim 4, wherein recovering the second pilot signal comprises subtracting the recovered first pilot signal from the composite pilot signal.

6. The method of claim 4, wherein recovering the second block of information comprises:
    regenerating a first estimate of that portion of the composite symbol-level signal that is attributable to the first block of information, using the recovered first block of information and the recovered first pilot signal;
    subtracting the first estimate from the composite symbol-level signal, thereby to provide a second estimate of that portion of the composite symbol-level signal that is attributable to the second block of information; and
    using the recovered second pilot signal to recover the second block of information from the second estimate.

7. The method of claim 4, wherein the sampled incoming signal comprises a broadcast superimposed with a unicast or multicast, one of said first and second blocks of information belongs to the broadcast, the other of said first and second blocks of information belongs to the unicast or multicast, one of said first and second pilot signals is a broadcast pilot signal, and the other of said first and second pilot signals is a unicast or multicast pilot signal, and the method further comprises:
    from the unicast or multicast pilot signal, computing rate information for a subsequent unicast or multicast transmission.

* * * * *